F. R. WALKER.
LOADING AND UNLOADING APPARATUS.
APPLICATION FILED AUG. 2, 1918.

1,306,158.

Patented June 10, 1919.
2 SHEETS—SHEET 1.

INVENTOR
Franklin R. Walker.
by Christy and Christy
Att'ys.

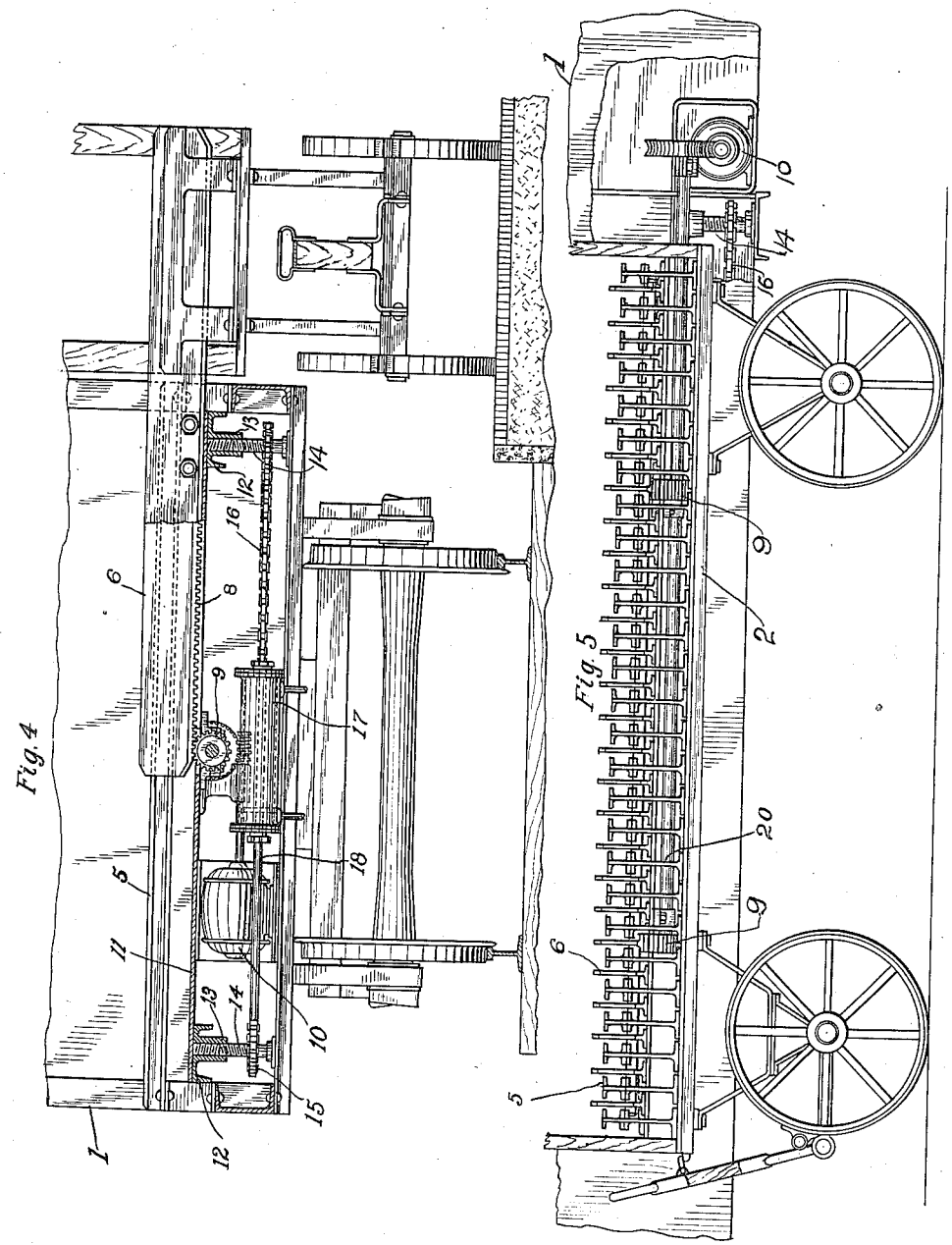

UNITED STATES PATENT OFFICE.

FRANKLIN R. WALKER, OF PITTSBURGH, PENNSYLVANIA.

LOADING AND UNLOADING APPARATUS.

1,306,158.　　　　　Specification of Letters Patent.　　Patented June 10, 1919.

Application filed August 2, 1918.　Serial No. 248,021.

*To all whom it may concern:*

Be it known that I, FRANKLIN R. WALKER, residing at Pittsburgh, in the county of Allegheny and State of Pennsylvania, a citizen of the United States, have invented or discovered certain new and useful Improvements in Loading and Unloading Apparatus, of which improvements the following is a specification.

My invention relates to loading and unloading apparatus, and while, in its broader aspects, it is unlimited to apparatus for any specific purpose, it finds particular applicability to the loading of railway baggage or express cars from trucks, as well as the unloading of such cars upon trucks.

The object of my invention is to provide a practical, economic and easily operated loading and unloading apparatus, whereby articles may be picked up from beneath, in the position and arrangement in which they are piled upon one floor, and transferred in such position and arrangement to another floor.

Figure 2:
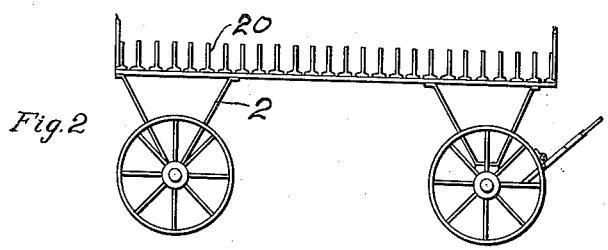
Figure 1:
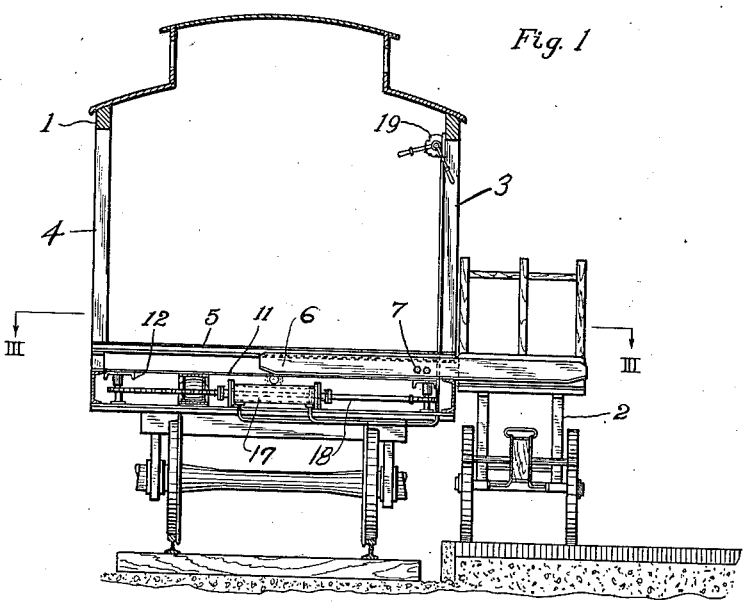
Figure 3:
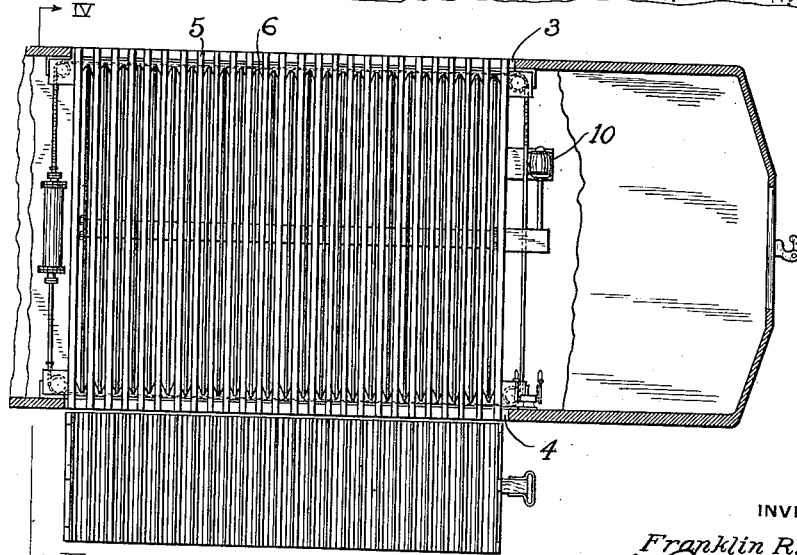

In the accompanying sheets of drawings, which form part of my specification, I have illustrated the preferred embodiment of my invention. Figure 1 is a vertical central sectional view of a railway express or baggage car and of a loading truck at its side; Fig. 2 a side view of the truck shown in Fig. 1; Fig. 3 a horizontal sectional view of car and truck taken on the line III—III, Fig. 1, portions of the car floor being broken away to show some of the operating mechanism; Fig. 4 a vertical sectional view to enlarged scale taken on the line IV—IV, Fig. 3; and Fig. 5 a right side view of the truck and car as shown in Fig. 4, a portion of the right side of the car being broken away to show some of the operating mechanism.

In the illustrated embodiment of my invention the loading and unloading apparatus is shown attached to, and as forming a part of a railway baggage or express car 1, the apparatus being here provided for the purpose of loading the car from, or unloading it upon a truck 2 which may be placed in proper position adjacent to a side door of the car.

The floor of the car 1, or that portion thereof lying between the oppositely disposed side doors 3 and 4, is constructed of a plurality of parallel bars 5, spaced apart laterally at suitable intervals, and extending transversely of the car from one door to the other. These bars 5, as indicated in Fig. 5, may take the form of I-beams.

The loading and unloading apparatus includes a platform preferably constructed of a plurality of bars 6 arranged in the spaces between the floor bars 5. The platform bars may be constructed of T's of considerably greater depth than the I-beams 5, and below the lower flanges of such I-beams they may be connected to each other by means of suitable rods 7. The platform thus constructed is adapted to move laterally beyond the car floor, and for effecting such movement the bottom of the platform may be provided with racks 8, which mesh with pinions 9 adapted to be driven by a motor 10.

Means are also provided for raising and lowering the platform so that the upper edges of the bars or T's 6 may be raised above or lowered beneath the plane of the car floor, that is to say the plane of the top flanges of the I-beams 5. To such end a plate 11, upon which the platform bars 6 rest for lateral sliding movement, is secured to channels or other suitable members 12 adapted to be simultaneously raised or lowered. While various mechanism may be provided for raising and lowering the platform-sustaining frame including the plate 11 and channels 12, I preferably provide four screw jacks arranged one at each corner of the frame. As seen in Fig. 4, oppositely threaded sleeves 13 project below the channels 12 and are engaged by rotatably mounted screws 14, provided with sprockets 15 adapted to be driven by a sprocket chain 16, which engages the sprocket 15 of each of the four screws 14 at the corners of the platform-sustaining frame. This sprocket chain may be moved in opposite directions by means of a compressed air cylinder 17 and piston rod 18, the supply of air to and from the opposite ends of the cylinder being controlled by a suitable valve 19 conveniently placed within the car 1.

The floor of the truck 2 is, in a manner similar to the floor of the car 1, constructed of a plurality of parallel bars 20, spaced at the same lateral intervals from each other as are the bars 5 of the car floor. These bars, which may be in the form of T's, are of greater depth than the platform T's 6, and the general arrangement is such that, when the truck is standing beside the car, the upper edges of the T's 20 lie in substantially the same horizontal plane as do the upper faces of the floor bars 5.

In describing the operation of the loading and unloading apparatus, it will be supposed first that it is desired to remove a load from the truck 2 and place it within the car 1. The truck is first brought to a position at the side of the car wherein the bars 20 are in alinement with the floor bars 5, the load resting upon the upper edges of the bars 20. With the platform-supporting frame 11, 12 in lowered position, the motor 10 is operated to move, through pinions 9 and racks 8, the platform 6 laterally to the position indicated in Fig. 1, in which the outer ends of the platform bars 6 will lie between the truck bars 20. The platform may then be raised by operating the pressure cylinder mechanism 17, 18, and by such movement the load previously sustained by the truck is raised from the truck and rests upon the movable platform. The motor 10 may then be driven in reverse direction to cause the platform to move within the car 1, and when it lies entirely within the car, it may be lowered to a position wherein its upper edges will lie below the upper faces of the floor bars 5. In this position the load thus carried into the the car will rest entirely upon the floor bars 5, and the platform may, while in lowered position, be immediately moved outwardly to receive a second load from a second truck in the manner just explained.

The raising of the platform with the second load on the outer ends of the bars 9 will also raise the previously moved load which, as it will be understood, will lie in the half of the car adjacent to the door through which it entered. Thus, the inward movement of the platform will carry the first removed load to the opposite side of the car and the last received load to the position which the first load previously occupied. It will thus be seen that two trucks may be very quickly unloaded, and it will be manifest that any number of trucks may be unloaded as rapidly as the workmen within the car can remove the loads from the floor bars 5.

It will be readily understood that my loading apparatus may be used for transferring loads from other floors than those mounted on truck wheels. And it will also be understood that the load-moving apparatus may be carried by either one of the load-supporting floors.

According to the provisions of the patent statutes, I have described the principle of my invention, together with the construction which I now consider to represent the best embodiment thereof. However, I desire to have it understood that, within the scope of the appended claims, my invention may be practised by other forms of construction than that shown in the drawings.

I claim as my invention:

1. The combination with a car provided with a floor comprising a plurality of horizontally disposed laterally separated bars, of a load moving apparatus comprising a platform constructed of a plurality of bars arranged in the spaces between said floor bars, a motor, driving connections between said motor and platform for moving said platform horizontally beyond the car floor, a second motor, and driving connections between said second motor and platform for raising and lowering said platform at any lateral position thereof and while remaining in a horizontal plane.

2. The combination with two adjacently disposed floors each constructed of a plurality of parallel bars arranged with intervening spaces, the bars of one floor being in end-to-end relationship with and parallel to the bars of the other floor, a load transferring apparatus comprising a platform consisting of a plurality of bars movable horizontally and to variable lateral positions between the bars of both of said floors, a motor, driving connections between said motor and platform for moving the latter horizontally, and means for raising and lowering said platform while remaining in a horizontal plane.

3. The combination with a car provided with a floor comprising a plurality of horizontally disposed laterally separated bars, of a load moving apparatus comprising a platform constructed of a plurality of bars arranged in the spaces between said floor bars, a motor, driving connections between said motor and platform for moving said platform laterally and in a continuously horizontal position beyond the car floor, a second motor, and driving connections between said second motor and platform for raising and lowering said platforms at any lateral position thereof and while remaining in a horizontal plane.

4. The combination with two adjacently disposed floors mounted on trucks and each constructed of a plurality of parallel bars arranged with intervening spaces, the bars of one floor being adapted to be placed in end-to-end relationship with and parallel to the bars of the other floor, a load transferring apparatus carried by one of said floors and comprising a platform consisting of a plurality of bars movable laterally and in a continuously horizontal position between the bars of both of said floors, a motor, driving connections between said motor and platform for moving the latter horizontally, and means for raising and lowering said platform at any lateral position thereof.

In testimony whereof I have hereunto set my hand.

FRANKLIN R. WALKER.

Witnesses:
PAUL N. CRITCHLOW,
FRANCIS J. TOMASSON.